UNITED STATES PATENT OFFICE.

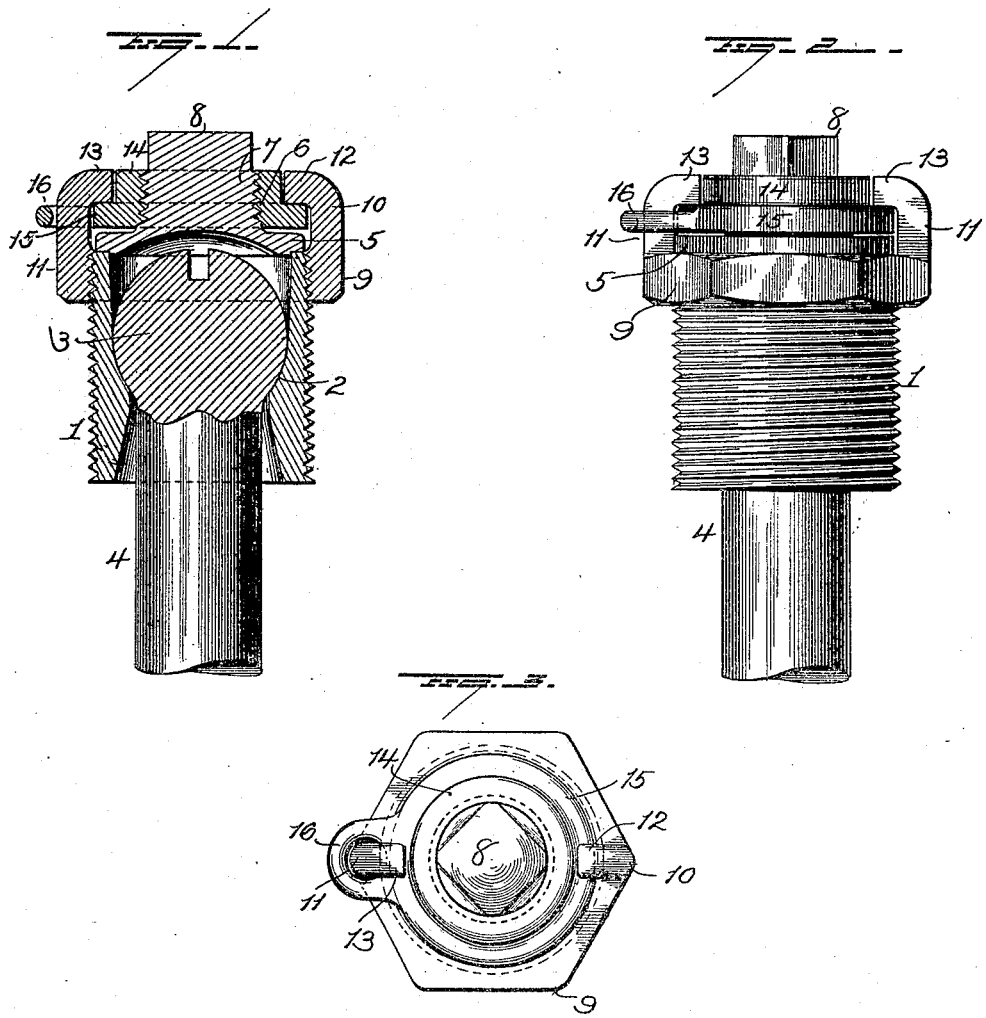

ETHAN I. DODDS, OF PITTSBURGH, PENNSYLVANIA, ASSIGNOR TO FLANNERY BOLT COMPANY, OF PITTSBURGH, PENNSYLVANIA.

STAY-BOLT STRUCTURE.

1,293,371.  Specification of Letters Patent.  Patented Feb. 4, 1919.

Application filed April 26, 1918. Serial No. 230,917.

*To all whom it may concern:*

Be it known that I, ETHAN I. DODDS, a citizen of the United States, and a resident of Pittsburgh, in the county of Allegheny and State of Pennsylvania, have invented certain new and useful Improvements in Stay-Bolt Structures; and I do hereby declare the following to be a full, clear, and exact description of the invention, such as will enable others skilled in the art to which it appertains to make and use the same.

This invention relates to improvements in staybolt structures and more particularly to the closure devices for the other end of the bearing sleeve,—the object of the invention being to facilitate the quick removal of the closure devices to give access to the head of the staybolt for testing the same and to so construct said devices that the end of the bearing sleeve shall be normally sealed.

With this and other objects in view, the invention consists in certain novel features of construction and combinations of parts as hereinafter set forth and pointed out in the claims.

In the accompanying drawings, Figure 1 is a longitudinal sectional view of a staybolt structure showing an embodiment of my invention. Fig. 2 is a side elevation, and Fig. 3 is a plan view.

1 represents a bearing sleeve which is externally threaded for connection with a boiler sheet and interiorly, this sleeve is made with a curved face 2 forming a bearing for the head 3 of the staybolt 4.

A cap 5 is seated on the end of the bearing sleeve and is made with a concave inner face whereby a suitable clearance 6 is afforded for the head of the staybolt. The cap 5 is made with an externally threaded shank or stem 7 having an angular end portion 8 to receive a wrench.

A collar 9 is threaded on the bearing sleeve 1 and is made with an angular external configuration for the application of a wrench. This collar is provided at diametrically opposite points with jaws 10 and 11, the lips 12—13 of which project inwardly.

An internally threaded ring 14 is screwed on the shank 7 of the cap 5 and is provided with an annular flange 15, over which the lips 12—13 of the jaws 10—11 project when the parts are in normal position, as shown in Fig. 1. The collar 14 is provided with an eye or loop 16 mounted loosely on the lug or jaw 11.

When the cap shall have been placed in position on its seat at the end of the bearing sleeve, the operator will turn said cap by the application of a wrench to the angular portion 8 of the shank 7 and this will cause the ring 14 to move outwardly and its annular shoulder 15 to bind tightly against the lips of the jaws 10—11 and the cap to be pressed tightly against its seat. To remove the cap the operator will turn the same in the reverse direction thus releasing the collar 14 from its binding engagement with the jaws. This will also unclamp the cap from its seat and said cap, together with the ring 14 may be swung laterally on its loose connection with the lug or jaw 11 and thus the head of the staybolt will be exposed for testing purposes. It is apparent that the cap may be as quickly replaced and locked into position on the end of the bearing sleeve.

Having fully described my invention what I claim as new and desire to secure by Letters-Patent, is:

1. In a staybole structure, the combination with a bearing sleeve and a cap having a threaded shank, of a collar mounted on the bearing sleeve and provided with jaws, and a ring threaded on the shank of the cap and having a flange to underlie the lips of said jaws, said ring having a loose connection with the collar on the bearing sleeve whereby said ring and cap may be swung laterally from the end of the bearing sleeve.

2. In a staybolt structure, the combination with a bearing sleeve, of a cap to seat thereon and having an externally threaded shank, a collar threaded on said bearing sleeve and provided with jaws, an internally threaded ring on the shank of the cap and having an annular flange to underlie said jaws, and a loop or eye on said ring loosely engaging one of said jaws.

In testimony whereof, I have signed this specification in the presence of two subscribing witnesses.

ETHAN I. DODDS.

Witnesses:
S. G. NOTTINGHAM,
R. S. FERGUSON.

Copies of this patent may be obtained for five cents each, by addressing the "Commissioner of Patents, Washington, D. C."